United States Patent
Nilsson et al.

(10) Patent No.: US 10,750,547 B2
(45) Date of Patent: Aug. 18, 2020

(54) BEAMFORMING BASED ON COMBINED BEAMS

(71) Applicant: Telefonaktiebolaget LM Ericsson (publ), Stockholm (SE)

(72) Inventors: Andreas Nilsson, Göteborg (SE); Fredrik Athley, Kullavik (SE); Sven Petersson, Sävedalen (SE)

(73) Assignee: TELEFONAKTIEBOLAGET LM ERICSSON (FUEL), Stockholm (SE)

( * ) Notice: Subject to any disclaimer, the term of this patent is extended or adjusted under 35 U.S.C. 154(b) by 290 days.

(21) Appl. No.: 15/529,294

(22) PCT Filed: May 4, 2017

(86) PCT No.: PCT/EP2017/060683
§ 371 (c)(1),
(2) Date: May 24, 2017

(87) PCT Pub. No.: WO2018/202303
PCT Pub. Date: Nov. 8, 2018

(65) Prior Publication Data
US 2018/0343687 A1    Nov. 29, 2018

(51) Int. Cl.
*H04W 76/10* (2018.01)
*H04B 7/0456* (2017.01)
(Continued)

(52) U.S. Cl.
CPC .............. *H04W 76/10* (2018.02); *H04B 1/69* (2013.01); *H04B 7/0482* (2013.01);
(Continued)

(58) Field of Classification Search
CPC ..... H04W 76/10; H04W 36/0083; H04B 1/69
(Continued)

(56) References Cited

U.S. PATENT DOCUMENTS

2013/0286960 A1   10/2013  Li et al.
2014/0177607 A1    6/2014  Li et al.
(Continued)

FOREIGN PATENT DOCUMENTS

EP    2 882 110 A1    6/2015
WO    2015090353 A1   6/2015

OTHER PUBLICATIONS

International Search Report and Written Opinion issued in International Application No. PCT/EP2017/060683, dated Jan. 26, 2018, 19 pages.

*Primary Examiner* — Nghi H Ly
(74) *Attorney, Agent, or Firm* — Rothwell, Figg, Ernst & Manbeck, P.C.

(57) ABSTRACT

There is provided mechanisms for beamforming. A method is performed by a network node. The network node is capable of communicating with served wireless devices using multiple beams generated by analog beamforming in an antenna array. The method comprises identifying, based on statistics of handovers of the served wireless devices between the beams, a need to combine at least two of the beams into a new beam. The method comprises determining beamforming weights to be applied at the analog antenna array for generating the new beam. The method comprises communicating with the served wireless devices using the new beam with the determined beamforming weights having been applied at the analog antenna array.

20 Claims, 4 Drawing Sheets

(51) Int. Cl.
*H04B 7/06* (2006.01)
*H04W 16/28* (2009.01)
*H04B 1/69* (2011.01)
*H04W 36/00* (2009.01)
*H04W 88/08* (2009.01)

(52) U.S. Cl.
CPC .......... *H04B 7/0695* (2013.01); *H04W 16/28* (2013.01); *H04W 36/0083* (2013.01); *H04W 88/085* (2013.01)

(58) Field of Classification Search
USPC ................. 455/436, 442, 422.1, 561, 432.1; 370/331
See application file for complete search history.

(56) References Cited

U.S. PATENT DOCUMENTS

2016/0036507 A1* 2/2016 Wang .................. H04B 7/0456
375/267
2016/0142959 A1* 5/2016 Wang .................. H04W 36/245
455/436
2016/0261325 A1* 9/2016 Ko ....................... H04B 7/0691

\* cited by examiner

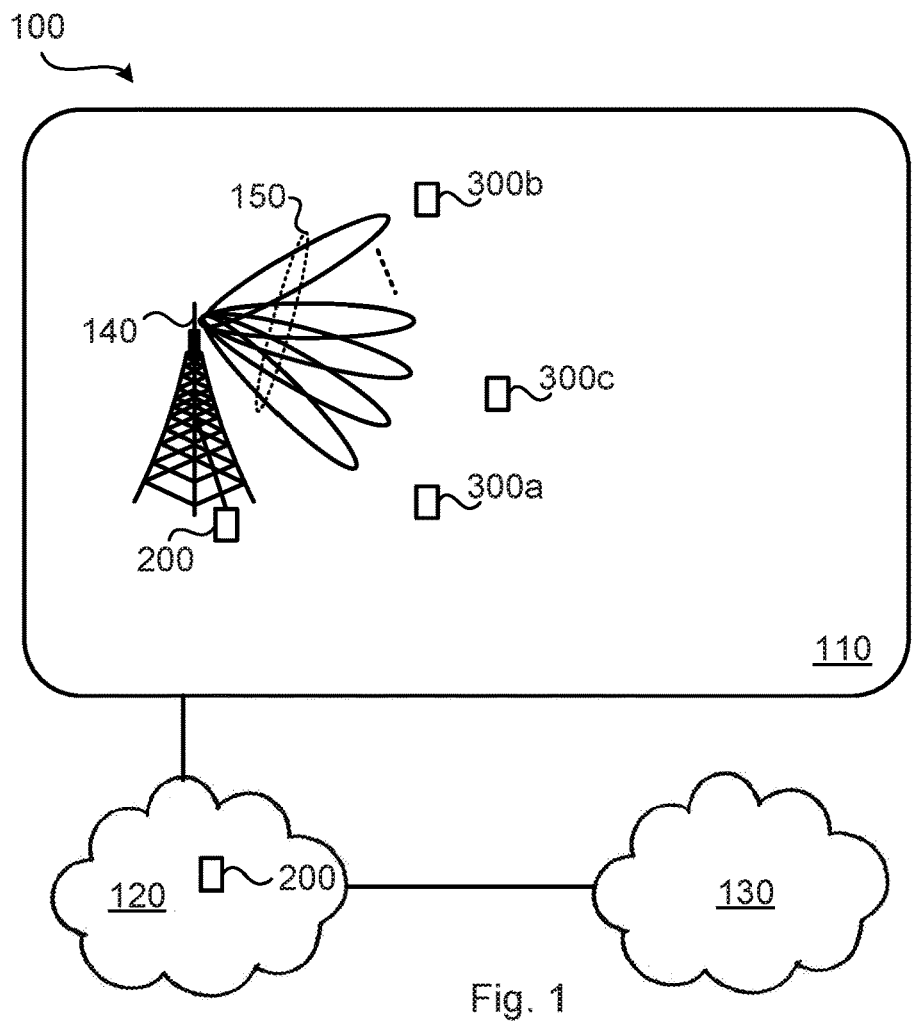
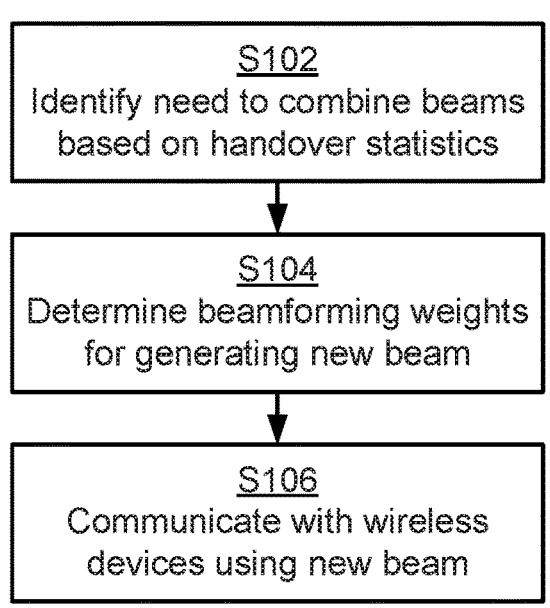
Fig. 1
Fig. 2

BEAMFORMING BASED ON COMBINED BEAMS

CROSS-REFERENCE TO RELATED APPLICATION(S)

This application is a 35 U.S.C. § 371 National Stage of International Patent Application No. PCT/EP2017/060683, filed May 4, 2017, designating the United States, the disclosure of which is incorporated by reference.

TECHNICAL FIELD

Embodiments presented herein relate to a method, a network node, a computer program, and a computer program product for beamforming.

BACKGROUND

In communications networks, there may be a challenge to obtain good performance and capacity for a given communications protocol, its parameters and the physical environment in which the communications network is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at wireless devices served by the network node). A beam pair link (BPL) is defined by the beam used by the TRP (denoted TRP beam) for communicating with the wireless device and the beam used by the wireless device (denoted WD beam) for communicating with the TRY. Each of the TRP beam and the WD beam could be used for any of transmission and reception. Likewise, there could be separate BPLs for downlink communications (Where the TRP beam is a transmission (TX) beam and where the WD beam is a reception (RX) beam) and uplink communications (where the TRP beam is an RX beam and where the WD beam is a TX beam).

In general terms, a beam management procedure is used to discover and maintain BPLs. A BPL is expected to be discovered and monitored by the network using measurements on downlink reference signals used for beam management, such as channel state information reference signals (CSI-RS). The CSI-RS for beam management can be transmitted periodically, semi-persistently or aperiodic (such as being event triggered) and they can be either shared between multiple wireless devices or be device-specific. In order to find a suitable TRP beam the TRP transmits CSI-RS in different TRP TX beams on which the wireless devices performs reference signal received power (RSRP) measurements and reports back the N best TRP TX beams (where the value of N can be configured by the network). Furthermore, the CSI-RS transmission on a given TRP TX beam can be repeated to allow the wireless device to evaluate suitable WD beams, thus enabling so-called WD RX beam training.

The wireless devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

One drawback with an analog beamforming implementation is that the TRP only can transmit or receive in one beam at a time (assuming one antenna array being active at the time, and the same beam being used for both polarizations, which usually is the case in order to counteract dropped signal strength due to polarization mismatching).

For served wireless devices with high mobility, beam management may require significant amount of overhead signalling due to the fact that the serving beam has to be updated frequently, thus resulting in a high number of handovers between different beams at one and the same TRP. This overhead is extra severe when the TRP is using analog beamforming, due to the fact that only one TRP beam then can be used at each time instance, which for example makes TRP beam sweeping (needed to find the new TRP beam) costlier.

Hence, there is still a need for improved beam management.

SUMMARY

An object of embodiments herein is to allow for beam management, that in view of the above, requires reduced overhead signalling and/or results in improved latency.

According to a first aspect there is presented a method for beamforming. The method is performed by a network node. The network node is capable of communicating with served wireless devices using multiple beams generated by analog beamforming in an antenna array. The method comprises identifying, based on statistics of handovers of the served wireless devices between the beams, a need to combine at least two of the beams into a new beam. The method comprises determining beamforming weights to be applied at the analog antenna array for generating the new beam. The method comprises communicating with the served wireless devices using the new beam with the determined beamforming weights having been applied at the analog antenna array.

According to a second aspect there is presented a network node for beamforming. The network node is capable of communicating with served wireless devices using multiple beams generated by analog beamforming in an antenna array. The network node comprises processing circuitry. The processing circuitry is configured to cause the network node to identify, based on statistics of handovers of the served wireless devices between the beams, a need to combine at least two of the beams into a new beam. The processing circuitry is configured to cause the network node to determine beamforming weights to be applied at the analog antenna array for generating the new beam. The processing circuitry is configured to cause the network node to communicate with the served wireless devices using the new beam with the determined beamforming weights having been applied at the analog antenna array.

According to a third aspect there is presented a network node for beamforming. The network node is capable of communicating with served wireless devices using multiple beams generated by analog beamforming in an antenna array. The network node comprises processing circuitry and a storage medium. The storage medium stores instructions that, when executed by the processing circuitry, cause the network node to perform operations, or steps. The operations, or steps, cause the network node to identify, based on statistics of handovers of the served wireless devices between the beams, a need to combine at least two of the beams into a new beam. The operations, or steps, cause the network node to determine beamforming weights to be applied at the analog antenna array for generating the new beam. The operations, or steps, cause the network node to communicate with the served wireless devices using the new beam with the determined beamforming weights having been applied at the analog antenna array.

According to a fourth aspect there is presented a network node for beamforming. The network node is capable of communicating with served wireless devices using multiple beams generated by analog beamforming in an antenna array. The network node comprises an identify module configured to identify, based on statistics of handovers of the served wireless devices between the beams, a need to combine at least two of the beams into a new beam. The network node comprises a determine module configured to determine beamforming weights to be applied at the analog antenna array for generating the new beam. The network node comprises a communicate module configured to communicate with the served wireless devices using the new beam with the determined beamforming weights having been applied at the analog antenna array.

According to a fifth aspect there is presented a computer program for beamforming. The computer program comprises computer program code which, when run on a network node capable of communicating with served wireless devices using multiple beams generated by analog beamforming in an antenna array, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these network nodes, this computer program and this computer program product provide efficient beamforming that can be used to mitigate, or at least reduce overhead signalling and/or resulting in improved latency. This allows for beam management with reduced overhead signalling and/or improved latency.

Advantageously this method, these network nodes, this computer program and this computer program product enable a reduction in the number of required handovers between beams, resulting in a reduction of overhead signalling and improved latency.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications network according to embodiments;

FIGS. 2 and 3 are flowcharts of methods according to embodiments;

DETAILED DESCRIPTION

Figure 3:
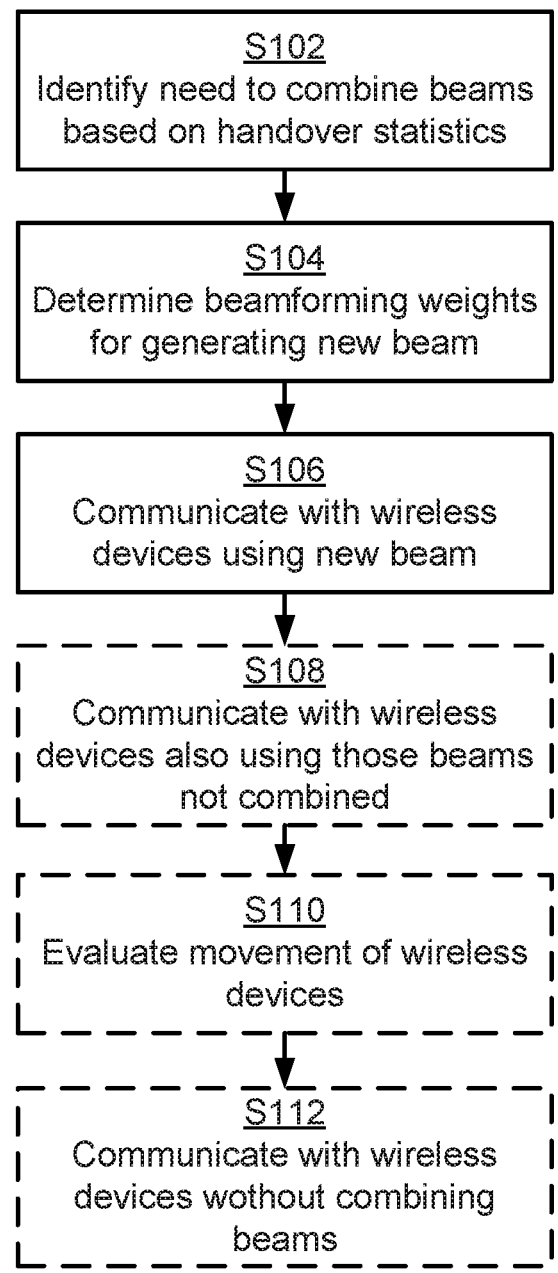

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard. The communications network 100 comprises at least one network node 200 configured to provide network access to wireless devices 300a, 300b, 300c in a radio access network 110. The radio access network no is operatively connected to a core network 120. The core network 120 is in turn operatively connected to a service network 130, such as the Internet. The wireless devices 300a, 300b, 300c are thereby, via the network node 200, enabled to access services of, and exchange data with, the service network 130. The network node 200 provides network access in the radio access network no by transmitting signals to, and receiving signals from, the wireless devices 300a, 300b, 300c. The signals could be transmitted from, and received by, an antenna array 140 of the network node 200. The antenna array 140 could form an integral part of the network node 200 or be physically separated from the network node 200. For example, the antenna array 140 could be part of a TRP.

Examples of network nodes are radio access network nodes, radio base stations, base transceiver stations, Node Bs, evolved Node Bs, gigabit Node Bs, access points, and access nodes. Examples of wireless devices are mobile stations, mobile phones, handsets, wireless local loop phones, user equipment (UE), smartphones, laptop computers, tablet computers, network equipped sensors, network equipped vehicles, and so-called Internet of Things devices.

The network node 200 and the wireless devices 300a, 300b, 300c are assumed to be configured to use beamforming when communicating with each other. In FIG. 1 this is illustrated by beams, collectively identified at reference numeral 150, being used at the antenna array 140 of the network node 200 for communicating with the wireless devices 300a, 300b, 300c.

As disclosed above, for served wireless devices 300a, 300b, 300c with high mobility, beam management may require significant amount of overhead signalling due to frequent handover between individual ones of the beams 150.

The embodiments disclosed herein therefore relate to mechanisms for beamforming that can be used to mitigate, or at least reduce overhead signalling and/or resulting in improved latency. In order to obtain such mechanisms there is provided a network node 200, a method performed by the network node 200, a computer program product comprising code, for example in the form of a computer program, that when run on a network node 200, causes the network node 200 to perform the method.

FIGS. 2 and 3 are flowcharts illustrating embodiments of methods for beamforming. The methods are performed by the network node 200. The methods are advantageously provided as computer programs 720.

Reference is now made to FIG. 2 illustrating a method for beamforming as performed by the network node 200 according to an embodiment. The network node 200 is capable of communicating with served wireless devices 300a, 300b, 300c using multiple beams 150, 150a, 150b, 150c, 150d, . . . , 150K, 160a, 160b generated by analog beamforming in an antenna array 140.

In general terms, the network node 200 collects statistics and evaluates whether there is a need to combine two or more existing beams 150a-150K. Particularly, the network node 200 is configured to perform step S102:

S102: The network node 200 identifies, based on statistics of handovers of the served wireless devices 300a, 300b, 300c between the beams 150a-150K, a need to combine at least two of the beams 150a-150K into a new beam 160a, 160b. Examples of need include, but are not limited to, frequent handovers between these at least two of the beams 150a-150K. Further aspects relating thereto will be disclosed below.

When such a need is identified the network node 200 generates a new beam. Thus the network node 200 is configured to perform step S104:

S104: The network node 200 determines beamforming weights to be applied at the analog antenna array 140 for generating the new beam 160a, 160b.

Aspects of how the beamforming weights could be determined will be disclosed below.

Once the beamforming weights have been determined they could be applied at the analog antenna array 140. Thus the network node 200 is configured to perform step S106:

S106: The network node 200 communicates with the served wireless devices 300a, 300b, 300c using the new beam 160a, 160b with the determined beamforming weights having been applied at the analog antenna array 140.

This enables efficient beamforming that can be used to mitigate, or at least reduce overhead signalling and/or resulting in improved latency. This allows for beam management with reduced overhead signalling and/or improved latency.

Figure 4:
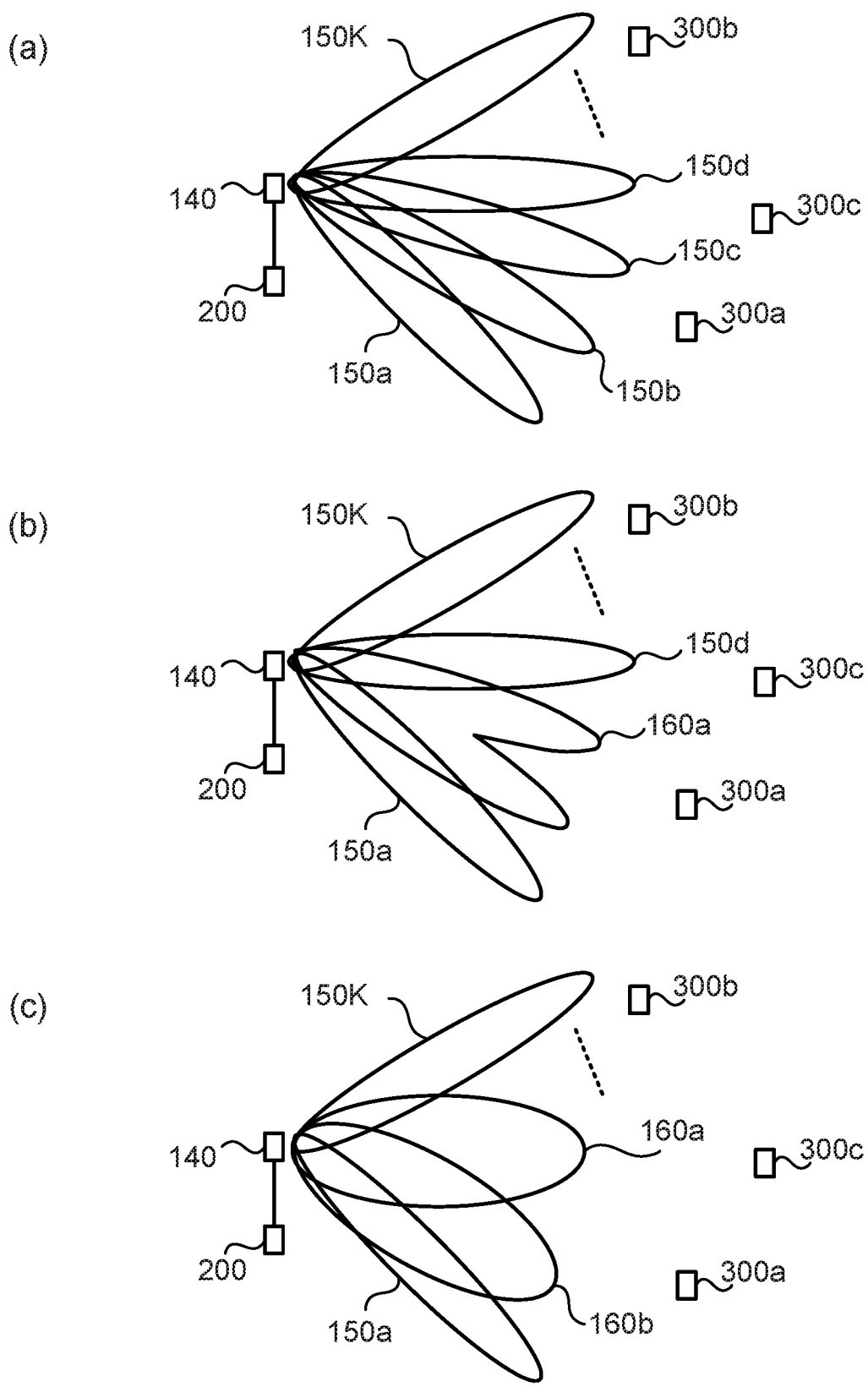
FIG. 4 schematically illustrates examples of beams generated by analog beamforming in an antenna array according to embodiments.

FIG. 4 schematically illustrates beams 150a, 150b, 150c, 150d, . . . , 150K, 160a, 160b generated by analog beamforming in the antenna array 140 according to three scenarios (a), (b), (c). FIG. 4(a) represents a scenario where wireless devices 300a, 300b, 300c are served by K beams 150a, 150b, 150c, 150d, . . . , 150K. These beams 150a-150K represent the original multiple (narrow) beams. FIG. 4(b) represents a scenario where two beams 150b, 150c of the original multiple beams 150a-150K have been combined into a single new (wide) beam 160a. FIG. 4(c) represents a scenario where three beams 150b, 150c of the original multiple beams 150a-150K have been combined into two new (wide) beams 160a, 160b.

It is further to be noted that although the beams 150a-150K, 160a, 160b are drawn to have a certain form or shape, the beams 150a-150K, 160a, 160b are drawn for illustrative purposes only, although at least beams 150a-150K generally could be so-called pencil beams. How to determine the form or shape of beams 160a-160b may vary depending on the scenario and will be further disclosed below.

It is thus to be noted that although the beams 150a-150K, 160a, 160b as drawn in FIG. 4 do not physically cover the wireless devices 300a, 300b, 300c, this is an intentional simplification made to make the FIG. 4 less cluttered. The same applies to FIG. 1.

It is further to be noted that, although FIGS. 4(b) and (c) illustrate scenarios where, in angular space, adjacent ones of the original multiple beams 150a-150K are combined into one or two new beams 160a, 160b, it is not a necessary requirement that the beams that are combined indeed are adjacent each other in angular space, although this might be the case. One example where it is not a necessary requirement that the beams that are combined indeed are adjacent each other is where blocking occurs for one or more beams sandwiched between the beams that are combined into one or two new beams 160a, 160b. Blocking may occur where there is a physical object obstructing the line of sight between the analog antenna array 140 of the network node 200 and the served wireless devices 300a, 300b, 300c. It is thus not necessary to include such blocked beams in the beams that are combined into one or two new beams 160a, 160b.

Embodiments relating to further details of beamforming as performed by the network node 200 will now be disclosed.

There could be different ways to determine the form or shape of the new beam 160a-160b. In general terms, the form or shape of the new beam 160a-160b is determined by its beamforming weights as determined in step S104. There may be different ways for the network node 200 to determine the beamforming weights in step S104. In some aspects the beamforming weights are determined such that the new beam 160a, 160b covers those beams that have been combined, thus yielding the same angular coverage. Thus, according to an embodiment, in angular space, the new beam 160a, 160b covers the at least two of the beams 150a-150K that are combined into the new beam 160a, 160b. The new beam 160a, 160b could cover the identified narrow beams in order to reduce the signalling overhead and latency e.g. caused by handover.

One example of determining the beamforming weights in step S104 is to add the beamforming weights for all the (narrow) beams 150a-150K that should be combined. Hence, according to an embodiment each of the at least two of the beams 150a-150K that are combined into the new beam 160a, 160b has a respective individual beamforming weight, and the beamforming weights of the new beam 160a, 160b are determined by summing all individual beamforming weights.

For example assume that three beams 150b, 150c, 150d having beamforming antenna weights w1, w2 and w3 are to be combined into one single beam. Then the beamforming antenna weights, w4, for the new beam 160a, 160b would be w4=w1+w2+w3. It is foreseen that the beamforming weights of the new beam 160a, 160b could have slightly different amplitudes for different antenna elements.

Another example is to determine the beamforming weights of the new beam 160a using an optimization tool that evaluates different phase settings and/or gain settings in order to achieve the desired new beam 160a, 160b.

Particularly, according to an embodiment the beamforming weights (of the new beam 160a, 160b are determined by evaluating a set of settings for the beamforming weights, where each setting results in a candidate new beam. The candidate beam best fulfilling a quality criterion is then selected as the new beam 160a, 160b.

Example beam shapes of the new beam 160a, 160b are illustrated in FIG. 4(b) (where there is a single new beam 160a) and 4(c) (where there are two new beams 160a, 160b).

There may be different ways to select the quality criterion. According to an embodiment the quality criterion represents a covering overlap with the at least two of the beams 150a-150K that are combined into the new beam 160a, 160b. This results in that the new beam 160a, 160b is selected as the candidate having largest covering overlap with those of the beams 150a-150K that are to be combined.

There may be different types of beamforming weights that are used to determine the new beam 160a, 160b. In general terms, proper phase settings (and if possible for the analog array, proper amplitude settings) are needed for each respective antenna element in the antenna array 140 in order to generate the new beam 160a, 160b.

In some aspects the antenna array 140 is configured such that it is impossible to change the amplitude per antenna element, and thus only the phase settings for the beamforming weights can be changed. Particularly, according to an embodiment the beams 150a-150K, 160a, 160b are generated by analog beamforming using beamforming weights representing phase shifts only. This assumes that there is one phase shifter per antenna element.

In other aspects the new beam 160a, 160b can be determined using a combination of gains and phase shifts. Particularly, according to an embodiment the beams 150a-150K, 160a, 160b are generated by analog beamforming using beamforming weights representing a combination of phase shifts and amplitude tapering. This assumes that there is one phase shifter and one gain adjuster (such as a power amplifier, a low-noise amplifier, and/or attenuator component) per antenna element.

There may be different ways for the network node 200 to identify the need to combine at least two of the beams 150a-150K into a new beam 160a, 160b in step S102.

As disclosed above, one example of need to combine at least two of the beams 150a-150K into a new beam 160a, 160b is when there are frequent handovers of the served wireless devices 300a, 300b, 300c between these at least two of the beams 150a-150K.

In some aspects the need is a relative need and relates to the number of handovers per time unit. In particular, according to an embodiment the need is identified as a result of the statistics of handovers indicating a higher number of handovers of the served wireless devices 300a, 300b, 300c between the beams 150a-150K per time unit than a first threshold value. The first threshold could, for example, be set such that the negative impact on the performance as caused by frequent handover signalling (in terms of signalling overhead and/or latency) is larger than the negative impact on the performance as caused by having slightly lower signal strength due to the use of wider (i.e. combined) beams.

In some aspects the need is an absolute need and relates to the total number of handovers. In particular, according to an embodiment the need is identified as a result of the statistics of handovers indicating a higher number of handovers of the served wireless devices 300a, 300b, 300c between the beams 150a-150K than a second threshold value. This need is identified regardless of how many handovers are performed per time unit. The second threshold could be set according to the same principles as the first threshold.

The network node 200 could thus, by analysing statistics of previous handovers of served wireless devices 300a, 300b, 300c between beams 150a-150K generated within the antenna array 140, determine beamforming weights for a new beam 160a covering at least two of the beams 150a-150K and serve at least the wireless devices 300a, 300b, 300c with high mobility (see, below) using the new beam 160a, 160b, thereby reducing the number of handovers between the beams.

There may be different ways for the network node 200 to determine which at least two of the beams 150a-150K to combine into the new beam 160a, 160b.

In some aspects a group of beams between which there are many handovers is identified. Particularly, according to an embodiment the higher number of handovers of the served wireless devices 300a, 300b, 300c is indicated between a group of the beams, and the group of beams defines which at least two of the beams that are to be combined into the new beam 160a, 160b.

In some aspects not only the number of handovers but also other properties, such as the signal strength, are considered when determining which at least two of the beams 150a-150K to combine into the new beam 160a, 160b. For examples the path gain for the wireless devices 300a, 300b, 300c served by the beams considered to be combined could be taken into account since the new beam 160a, 160b could have reduce antenna gain compared to the original beams. Particularly, according to an embodiment the need further is identified based on at least one of signal strength measurements and path gain estimates of the served wireless devices 300a, 300b, 300c. In this way it could be possible to make sure that no network coverage holes are generated when generating the new beam 160a, 160b.

It could be difficult to generate one new (broad) beam 160a that covers all the (narrow) beams that should be combined. In some aspects it is therefore possible to combine the (narrow) beams into two or more (broad) beams instead of one single (broad) beam. That is, although it has been disclosed that one new beam is generated 160a, 160b, it could be that at least two new (broad) beams 160a, 160b are generated from the multiple (narrow) beams 150a-150K. Particularly, according to an embodiment the beamforming weights are determined for two new beams 160a, 160b to be generated. The served wireless devices 300a, 300b, 300c are then communicated with using these two new beams 160a, 160b. This might cause more handovers than if only one single new beam 160a is generated, but still less handovers compared to the default scenario using multiple (narrow) beams 150a-150K. In any case, a reduction in number of used beams is made regardless whether only a single new beam is generated or two new beams are generated.

Reference is now made to FIG. 3 illustrating methods for beamforming as performed by the network node 200 according to further embodiments. It is assumed that steps S102, S104, S106 are performed as described above with reference to FIG. 2 and a thus repeated description thereof is therefore omitted.

Just because the network node 200 determines beamforming weights for a new beam 160a, 160b and, as in step S106, communicates with the served wireless devices 300a, 300b, 300c using the new beam 160a, 160b this does not exclude the network node 200 to communicate with at least some of the served wireless devices 300a, 300b, 300c also using any of those of the beams 150a-150K that have not been combined. Hence, according to an embodiment not all of the multiple beams 150a-150K have been combined into the new beam 160a, 160b and the network node 200 is configured to perform step S108:

S108: The network node 200 communicates with the served wireless devices 300a, 300b, 300c also using those of the multiple beams 150a-150K not being combined into the new beam 160a, 160b.

In general terms, stationary wireless devices would benefit from using the original, non-combined (narrow) beams 150a-150K, instead of a new (wide) beam 160a, 160b with a possible reduced antenna gain. The network node 200 could therefore evaluate the mobility of the wireless devices 300a, 300b, 300c in order to identify stationary wireless devices. For example, stationary wireless devices could be defined by those wireless devices that do not have frequent handovers. Another way to evaluate mobility is to use positioning information of the wireless devices 300a, 300b, 300c, possible together with environmental information such as maps (in order to determined roads, buildings, etc. where the wireless devices are likely to be located).

Another way is to always use only narrow beams as a starting point, and if a quick handover is needed for example between beams and beam 2 it is large probability that it is a UE traveling on the road, hence the larger beam should be applied. Particularly, according to an embodiment the network node 200 is configured to perform step S110:

S110: The network node 200 evaluates movement of the served wireless devices 300a, 300b, 300c.

Communications can then be continued in at least one of the original, non-combined (narrow) beams 150a-150K as well as in the new beam 160a, 160b. Particularly, according to this embodiment the network node 200 is configured to perform step S112:

S112: The network node 200 continues to communicate using at least one of the at least two of the beams 150b, 150c, 150d that are combined into the new beam 160a, 160b with those of the wireless devices 300c for which the movement indicates geographical stationarity. This enables communications with the wireless devices also using the original, non-combined (narrow) beams. The best beams can thereby be applied for each respective served wireless device 300a, 300b, 300c.

Figure 5:
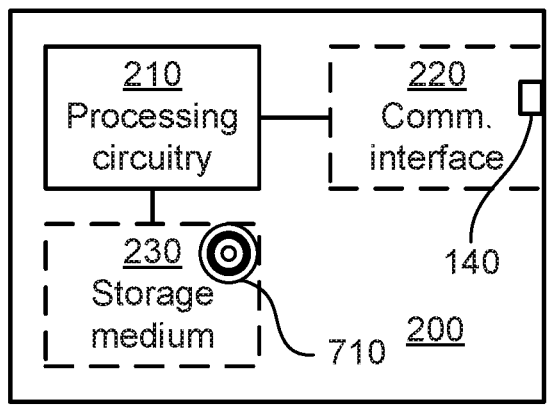
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S112, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, nodes, functions, and devices of the communications network 100. As such the communications interface 220 may comprise one or more transmitters and receivers, comprising analogue and digital components. Particularly, the communications interface 220 could comprise at least one antenna array 140. Alternatively the communications interface 220 is operatively connected to at least one antenna array 140. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
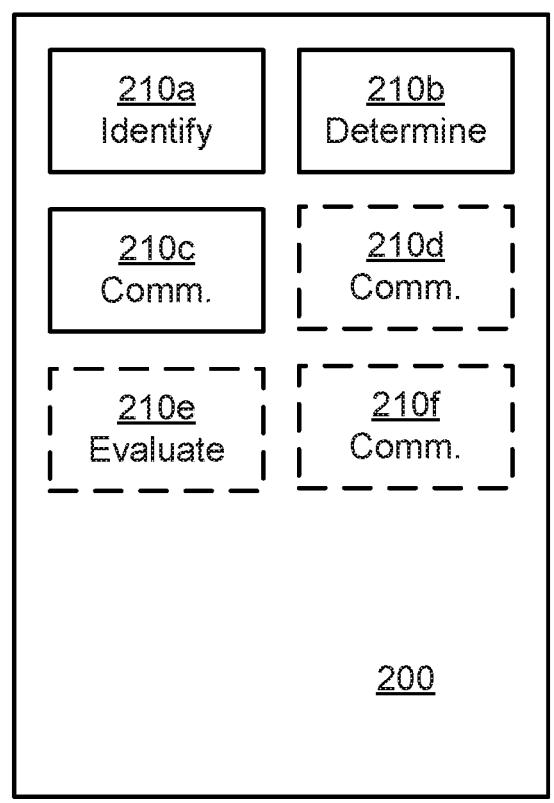
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a number of functional modules; an identify module 210a configured to perform step S102, a determine module 210b configured to perform step S104, and a communicate module 210c configured to perform step S106. The network node 200 of FIG. 6 may further comprise a number of optional functional modules, such as any of a communicate module 210d configured to perform step S108, an evaluate module 210e configured to perform step S110, and a communicate module 210f configured to perform step S112. The network node 200 of FIG. 6 could further comprise at least one antenna array 140.

In general terms, each functional module 210a-210f may in one embodiment be implemented only in hardware and in another embodiment with the help of software, the latter embodiment having computer program instructions stored on the storage medium 230 which when run on the processing circuitry makes the network node 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The network node 200 may be provided as a standalone device or as a part of at least one further device. For example, the network node 200 may be provided in a node of the radio access network no or in a node of the core network 120. Alternatively, functionality of the network node 200 may be distributed between at least two devices, or nodes. These at least two nodes, or devices, may either be part of the same network part (such as the radio access network no or the core network 120) or may be spread between at least two such network parts.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 720 of FIG. 7 (see below).

Figure 7:
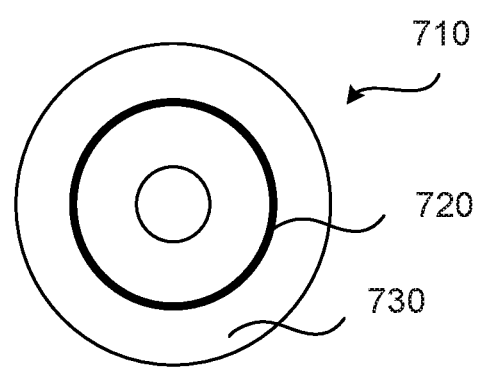
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beamforming, the method being performed by a network node, the method comprising:
generating multiple beams using analog beamforming in an antenna array, wherein generating the multiple beams using analog beamforming comprises generating a first beam using analog beamforming and generating a second beam using analog beamforming;
communicating with served wireless devices using the generated multiple beams;
obtaining statistics of handovers of the served wireless devices between beams;
based on the obtained statistics of handovers, identifying a need to generate a new beam based on the first beam and the second beam;
determining beamforming weights to be applied at the analog antenna array for generating the new beam; and
communicating with the served wireless devices using the new beam with the determined beamforming weights having been applied at the analog antenna array.

2. The method according to claim 1, wherein the space covered by the new beam at least partially overlaps the space covered by said at least two of the beams that are combined into the new beam.

3. The method according to claim 1, wherein each of said at least two of the beams that are combined into the new beam has a respective individual beamforming weight, and wherein the beamforming weights of the new beam are determined by summing all individual beamforming weights.

4. The method according to claim 1, wherein the beamforming weights are determined by evaluating a set of a candidate beams and selecting as the new beam a candidate beam best fulfilling a quality criterion.

5. The method according to claim 4, wherein the quality criterion represents covering overlap with said at least two of the beams that are combined into the new beam.

6. The method according to claim 1, wherein the beams are generated by analog beamforming using beamforming weights representing phase shifts only.

7. The method according to claim 1, wherein the beams are generated by analog beamforming using beamforming weights representing a combination of phase shifts and amplitude tapering.

8. The method according to claim 1, wherein the need is identified as a result of the statistics of handovers indicating higher number of handovers of the served wireless devices between the beams per time unit than a threshold value.

9. The method according to claim 1, wherein the need is identified as a result of the statistics of handovers indicating higher number of handovers of the served wireless devices between the beams than a threshold value, regardless of how many handovers are performed per time unit.

10. The method according to claim 8, wherein the higher number of handovers of the served wireless devices is indicated between a group of the beams, and wherein the group of beams defines which at least two of the beams that are to be combined into the new beam.

11. The method according to claim 1, wherein the need further is identified based on at least one of signal strength measurements and path gain estimates of the served wireless devices.

12. The method according to claim 1, wherein not all of the multiple beams have been combined into the new beam, the method further comprising:
communicating with the served wireless devices also using those of the multiple beams not being combined into the new beam.

13. The method according to claim 1, further comprising:
evaluating movement of the served wireless devices; and
continuing communicating using at least one of the at least two of the beams that are combined into the new beam with those of the wireless devices for which the movement indicates geographical stationarity.

14. The method according to claim 1, wherein the beamforming weights are determined for two new beams to be generated, and wherein the served wireless devices are communicated with using said two new beams.

15. The method of claim 1, further comprising:
communicating with a first served wireless device using the first beam;
communicating with a second served wireless device using the second beam;
collecting statistics of handovers of served wireless devices between the first beam and the second beam; and
as a result of identifying the need to generate the new beam based on the first beam and the second beam, generating the new beam based on i) beamforming weights associated with the first beam and ii) beamforming weights associated with the second beam, wherein
the new beam is wider than the first beam,
the new beam is wider than the second beam, and
the first served wireless device and the second served wireless device are the same or different.

16. A network node for beamforming, the network node comprising processing circuitry, the processing circuitry being configured to cause the network node to:
generate multiple beams using analog beamforming in an antenna array, wherein generating the multiple beams using analog beamforming comprises generating a first beam using analog beamforming and generating a second beam using analog beamforming;
communicate with served wireless devices using the generated multiple beams;
obtain statistics of handovers of the served wireless devices between beams;
based on the obtained statistics of handovers, identify a need to generate a new beam based on the first beam and the second beam;
determine beamforming weights to be applied at the analog antenna array for generating the new beam; and
communicate with the served wireless devices using the new beam with the determined beamforming weights having been applied at the analog antenna array.

17. A computer program product comprising a non-transitory computer readable medium storing a computer program for beamforming, the computer program comprising computer code which, when run on processing circuitry of a network node, causes the network node to:
generate multiple beams using analog beamforming in an antenna array, wherein generating the multiple beams using analog beamforming comprises generating a first beam using analog beamforming and generating a second beam using analog beamforming;
communicate with served wireless devices using the generated multiple beams;
obtain statistics of handovers of the served wireless devices between beams;
based on the obtained statistics of handovers, identify a need to generate a new beam based on the first beam and the second beam;
determine beamforming weights to be applied at the analog antenna array for generating the new beam; and
communicate with the served wireless devices using the new beam with the determined beamforming weights having been applied at the analog antenna array.

18. The network node according to claim 16, wherein the space covered by the new beam at least partially overlaps the space covered by said at least two of the beams that are combined into the new beam.

19. The network node according to claim 16, wherein each of said at least two of the beams that are combined into the new beam has a respective individual beamforming weight, and wherein the beamforming weights of the new beam are determined by summing all individual beamforming weights.

20. The network node according to claim 16, wherein the beamforming weights are determined by evaluating a set of settings for the beamforming weights, each setting resulting in a candidate new beam, and selecting as the new beam the candidate beam best fulfilling a quality criterion, wherein the quality criterion represents covering overlap with said at least two of the beams that are combined into the new beam.

* * * * *